(12) United States Patent
Jelonnek et al.

(10) Patent No.: US 6,810,092 B1
(45) Date of Patent: Oct. 26, 2004

(54) METHOD AND CIRCUITRY FOR DEMODULATING A DIGITAL FREQUENCY MODULATED SIGNAL

(75) Inventors: Bjoern Jelonnek, Ulm (DE); Lothar Vogt, Barienrode (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,738

(22) PCT Filed: Oct. 21, 1999

(86) PCT No.: PCT/DE99/03372

§ 371 (c)(1),
(2), (4) Date: Oct. 11, 2000

(87) PCT Pub. No.: WO00/39975

PCT Pub. Date: Jul. 6, 2000

(30) Foreign Application Priority Data

Dec. 28, 1998 (DE) ......................... 198 60 402

(51) Int. Cl.[7] ................................. H03D 3/00
(52) U.S. Cl. ................. 375/322; 375/302; 375/233; 375/271
(58) Field of Search ................. 375/322, 302, 375/233, 271, 346, 324, 344, 297, 328; 329/343, 315, 318, 320, 323, 336; 455/137; 342/173

(56) References Cited

U.S. PATENT DOCUMENTS

| 4,309,772 | A | | 1/1982 | Kloker et al. | |
|---|---|---|---|---|---|
| 4,397,036 | A | * | 8/1983 | Hirade et al. | 455/137 |
| 5,185,609 | A | * | 2/1993 | DeBord | 342/173 |
| 5,550,869 | A | * | 8/1996 | Gurantz et al. | 375/340 |
| 6,075,410 | A | * | 6/2000 | Wildhagen | 329/318 |
| 6,664,849 | B1 | * | 12/2003 | Taura et al. | 329/315 |

OTHER PUBLICATIONS

Modified CORDIC demodulator implementation for digital IF–sampled receiver□□Chen, A.; McDanell, R.; Boytim, M.; Pogue, R.; Global Telecommunications Conference, 1995. GLOBECOM '95., IEEE , vol.: 2 , Nov. 13–17, 1995□□pp.: 1450–1454 vol. 2.*

Chen et al., *Reduced Complexity Cordic Demodulator Implementation For D–Amps and Digital IF–Sampled Receiver*, IEEE Global Telecommunications Conference, US, New York, 1998.

* cited by examiner

*Primary Examiner*—Stephen Chin
*Assistant Examiner*—Ted Wang
(74) *Attorney, Agent, or Firm*—Kenyon & Kenyon

(57) ABSTRACT

A method and a circuitry for demodulating a digital frequency-modulated signal. After demodulating the digital frequency-modulated signal for generating the signal's amplitude and differential phase value $\phi$, the amplitude of the demodulated signal is compared with a constant at determined sampling times. The phase value of each sampling time is multiplied by a factor, the factor (c) being the product of the amplitude of the determined sampling time and the amplitude of a preceding sampling time, if the amplitude is less than the constant.

9 Claims, 1 Drawing Sheet

METHOD AND CIRCUITRY FOR DEMODULATING A DIGITAL FREQUENCY MODULATED SIGNAL

BACKGROUND INFORMATION

The present invention relates to a method and a circuitry for demodulating a digital frequency-modulated signal to improve the signal within the small signal range.

Many methods are known for digitally demodulating a frequency-modulated (FM) signal, for example the COR-DIAL algorithm. These demodulators present the problem that the signal-noise ratio decreases disproportionately at the demodulator output when the signal-noise ratio of the input signal falls below a certain threshold. This threshold is normally called the FM threshold. This critical point is reached approximately when the noise amplitude is of the same order of magnitude as the signal amplitude. Phase jumps then occur in the demodulated signal.

SUMMARY OF THE INVENTION

It is therefore an object of the present invention to create a method and a circuitry for digitally demodulating a frequency-modulated signal, with which signal the aforementioned drawbacks are largely avoided and the FM reception is improved.

The object is achieved in that, after demodulating the digitized frequency-modulated signal for generating the signal's amplitude $A(n)$ and differential phase value $\phi'(n)$, the following steps are performed:

comparing the amplitude $A(n)$ of the demodulated signal with a constant K at determined sampling times n, multiplying the differential phase value $\phi(n)$ of each sampling time n by factor c, factor c being the product of amplitude $A(n)$ of the determined sampling time and amplitude $A(n-1)$ of a preceding sampling time, if amplitude $A(n)$ is less than constant K.

According to the present invention, therefore, instantaneous amplitude value $A(n)$ is additionally provided at the demodulator output and the frequency-modulated signal is modified by this amplitude value. Signal correction occurs only when the signal amplitude drops below a specific value, so that the pulse spikes are reduced in the signal. It has been established that a preceding amplitude value is also advantageously considered in the signal correction and that the demodulator output signal to be corrected, namely differential phase $\phi(n)$, is multiplied by the product of amplitude value $A(n)$ and preceding amplitude value $A(n-1)$.

When amplitude value $A(n)$ is greater than or equal to chosen constant K, then the factor should be equal to 1, so that the demodulator output signal remains unchanged.

Advantageously, the method should be performed continuously, amplitude $A(n)$ being compared with constant K and the demodulator output signal being multiplied with the appropriate factor c at each sampling time n. It is advisable that preceding amplitude value $A(n-1)$ to be considered be amplitude value $A(n-1)$ directly preceding instantaneous amplitude value $A(n)$.

In particular, the method is suitable for FM receivers, the following steps being performed before demodulating the digital frequency-modulated signal:

converting an analog high-frequency signal into a digital signal, mixing the digital signal into a base band, filtering the base band signal.

The circuitry according to the present invention correspondingly has a time delay element at the output of the demodulator for the digital amplitude value $A(n)$, a comparator at the output of the demodulator and time delay element for comparing instantaneous amplitude value $A(n)$ with constant K, a multiplier for forming the product of instantaneous amplitude value $A(n)$ and preceding amplitude value $A(n-1)$, factor c being equal to the product, if instantaneous amplitude value $A(n)$ is less than constant K, a multiplier for multiplying differential phase signal $\phi'(n)$ by factor c, for generating a demodulated output signals MAX.

Advantageously, the time delay element is designed so that the product is formed from instantaneous amplitude value $A(n)$ and directly preceding amplitude value $A(n-1)$.

When instantaneous amplitude value $A(n)$ is greater than or equal to constant K, factor c should be set equal to 1.

BRIEF DESCRIPTION OF THE DRAWING

The drawing shows a block diagram of the circuitry for digitally demodulating a frequency-modulated signal.

DETAILED DESCRIPTION

Figure 1:
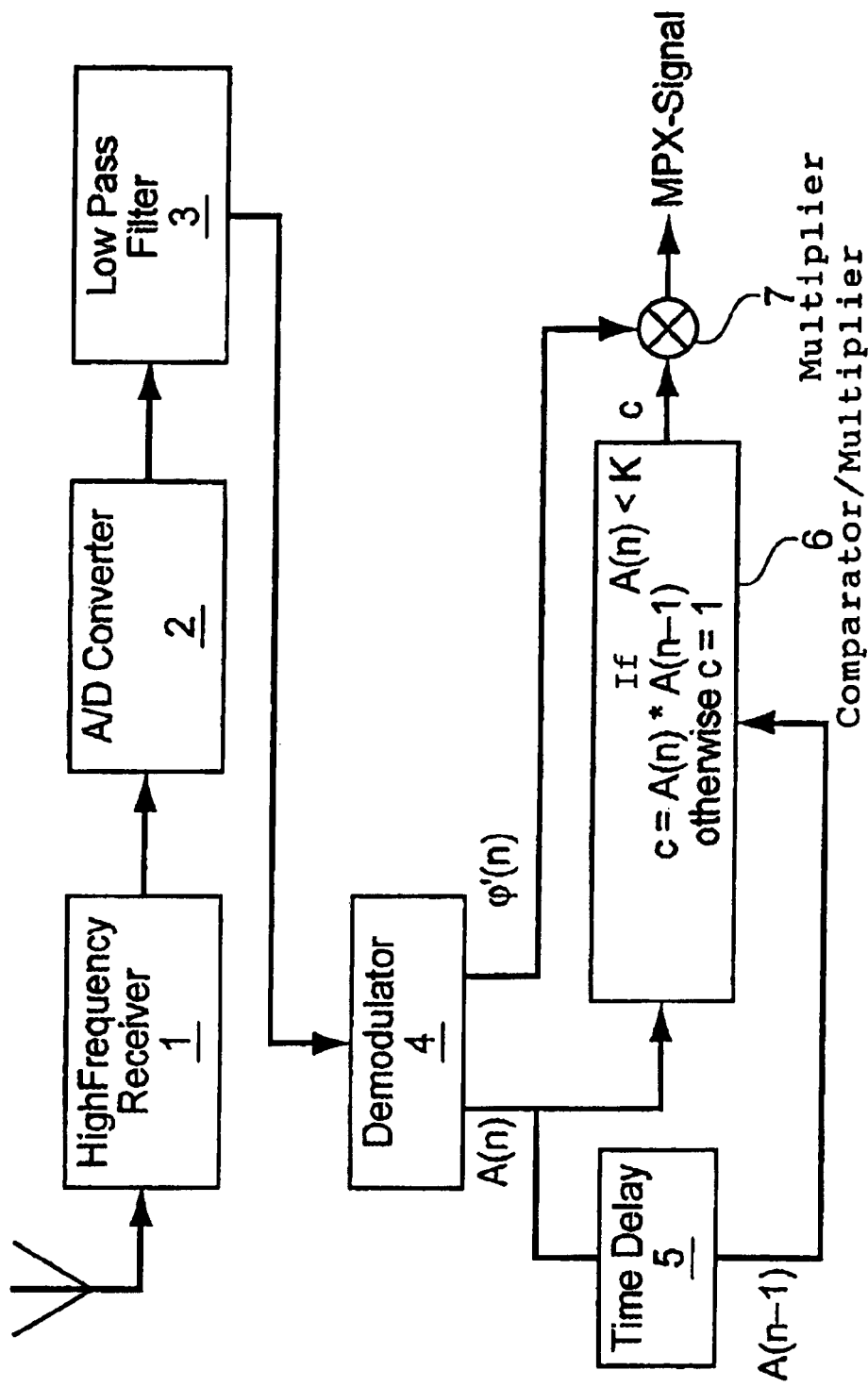

High-frequency receiver (1) is coupled to an antenna to receive a frequency-modulated signal. Unit (2) having an analog-digital converter for converting the analog high-frequency signal into a digital signal, and a mixer for mixing the digital signal into the base band are at the output of high-frequency receiver (1). The resulting digital base band signal is preferably low-pass filtered using filter (3) and sent to demodulator (4). In the demodulator the filtered base band signal is demodulated by known methods.

The input signal of demodulator (4) can be described by two signal components (x) and (y) orthogonal to one another:

$$x(n)=a(n)*\cos(s(n))+r1(n)=:A(n)*\cos(\phi(n)),$$

$$y(n)=a(n)*\sin(s(n))+r2(n)=:A(n)*\sin(\phi(n)).$$

Where:

a(n): amplitude at nth sampling time s(n): modulation at nth sampling time r1(n): real part of noise component at nth sampling time r2(n): imaginary part of noise component at nth sampling time A(n): amplitude value at nth sampling time $\phi$(n): phase value at nth sampling time.

Demodulator (4) generates differential phase $\phi'(n)$ as a demodulator output signal, i.e., the derivative of phase value $\phi(n)$. For large signal noise ratios, noise components r1(n) and r2(n) are negligible. For the derivative of modulation at nth sampling time s'(n) and differential phase $\phi'(n)$ then the following applies:

$$s'(n) \approx \phi'(n) \approx \phi(n) - \phi(n-1)$$

It is clear from the above equations that there are phase jumps in the demodulated signal, as soon as the noise amplitude reaches the order of magnitude of the signal amplitude.

Demodulator (4) has a second output for amplitudes $A(n)$ of the demodulated signal at each sampling time n. Time delay element (5) and also comparator-multiplier element (6) having a comparator and a multiplier are provided at the second output in order to calculate factor (c) as the product of instantaneous amplitude value a(n) and delayed amplitude value a(n−1) at the output of time delay element (5), if instantaneous amplitude value A(n) is less than a constant. The output of comparator-multiplier element (6) is connected to multiplier (7) in order to form demodulator output signal (MAX) as a product of calculated factor (c) and differential phase value $\phi'(n)$. If amplitude value A(n) is greater than or equal to the constant, the output of the comparator-multiplier element is set at logical "1". Demodulator output signal (MAX) is then equal to differential phase value $\phi'(n)$. Pulse spikes in the demodulator output signal are reduced and the FM reception is improved by correcting differential phase value $\phi'(n)$ at low amplitudes A(n) by multiplying by instantaneous amplitude value A(n) and directly preceding amplitude value A(n−1), as the phase jumps are compensated for in the demodulated signal.

What is claimed is:

1. A method for demodulating a digital frequency-modulated signal, comprising the steps of:

demodulating the digital frequency-modulated signal;

generating an amplitude of the digital frequency-modulated signal as a first output signal;

generating a differential phase value of the digital frequency-modulated signal as a second output signal;

comparing the amplitude of the demodulated digital frequency-modulated signal with a constant at established sampling times; and multiplying the differential phase value of each sampling time by a factor that is a product of the amplitude at one of the established sampling times and the amplitude at a preceding established sampling time, if the amplitude is less than the constant.

2. The method according to claim 1, wherein:

the factor is equal to 1, if the amplitude is one of greater than and equal to the constant.

3. The method according to claim 1, wherein:

the step of comparing and the step of multiplying are executed at every established sampling time.

4. The method according to claim 3, further comprising the step of:

calculating the factor as a product of the amplitude at one of the established sampling times and the amplitude at a directly preceding established sampling time, if the amplitude is less than the constant.

5. The method according to claim 1, wherein before an execution of the demodulating step, the method comprises the steps of:

converting an analog high-frequency signal into a digital signal;

mixing the digital signal into a base band signal; and filtering the base band signal.

6. A circuit for digitally demodulating a frequency-modulated signal, comprising:

a demodulator including a first output for outputting a digital amplitude value and a second output for outputting a differential phase signal;

a time delay element arranged at the first output of the demodulator;

a comparator-multiplier element including a comparator arranged on the first output of the demodulator and on an output of the time delay element for comparing the digital amplitude value with a constant;

a first multiplier for forming a product of the digital amplitude value and a preceding amplitude value, a factor being equal to the product, if the digital amplitude value is less than the constant; and a second multiplier for multiplying the differential phase signal by the factor for generating a demodulated output signal.

7. The circuit according to claim 6, wherein:

the time delay element is designed so that the product of the digital amplitude value and the preceding amplitude value is formed.

8. The circuit according to claim 7, wherein:

the factor is equal to 1 if the digital amplitude value is one of greater than and equal to the constant.

9. The circuit according to claim 6, further comprising:

a high-frequency receiver;

a unit including a mixer and an analog-digital converter for performing a digital conversion of the frequency-modulated signal; and a filter for the digital frequency-modulated signal connected upstream from the demodulator.

* * * * *

UNITED STATES PATENT AND TRADEMARK OFFICE
CERTIFICATE OF CORRECTION

PATENT NO. : 6,810,092 B2
DATED : October 26, 2004
INVENTOR(S) : Jelonnek

It is certified that error appears in the above-identified patent and that said Letters Patent is hereby corrected as shown below:

<u>Column 1,</u>
Lines 12-13, change "the COR DIAL algorithm." to -- the COR DIC algorithm. --.

<u>Column 3,</u>
Line 9, change "signal (MAX)" to -- signal (MPX) --.

Signed and Sealed this

Second Day of May, 2006

JON W. DUDAS
*Director of the United States Patent and Trademark Office*